United States Patent

Morikawa

Patent Number: 5,887,977
Date of Patent: Mar. 30, 1999

[54] STATIONARY IN-LINE MIXER

[75] Inventor: Hideyuki Morikawa, Tokyo, Japan

[73] Assignee: Uniflows Co., Ltd., Tokyo, Japan

[21] Appl. No.: 941,644

[22] Filed: Sep. 30, 1997

[51] Int. Cl.[6] .................................................. B01F 5/00
[52] U.S. Cl. .................................. 366/340; 138/42
[58] Field of Search .................................. 366/340, 336, 366/337, 338, 339; 138/41, 42

[56] References Cited

U.S. PATENT DOCUMENTS

| | | | |
|---|---|---|---|
| 3,526,391 | 9/1970 | Church, Jr. ............................. | 366/340 |
| 4,869,849 | 9/1989 | Hirose et al. ........................... | 366/340 |
| 4,886,369 | 12/1989 | Hankison ................................ | 366/340 |
| 5,327,941 | 7/1994 | Bitsakis et al. ........................ | 366/340 |
| 5,672,821 | 9/1997 | Suzuki ...................................... | 138/42 |

*Primary Examiner*—Tony G. Soohoo
*Attorney, Agent, or Firm*—Larry D. Johnson

[57] ABSTRACT

An apparatus to mix various liquids in fluid streams includes an outer casing with a plurality of fluid inlets and a fluid outlet, and a plurality of discs bearing a plurality of different holes or groove arrangements stacked one upon another between the fluid inlets and outlet to induce a rotational angular velocity to the fluid streams.

6 Claims, 2 Drawing Sheets

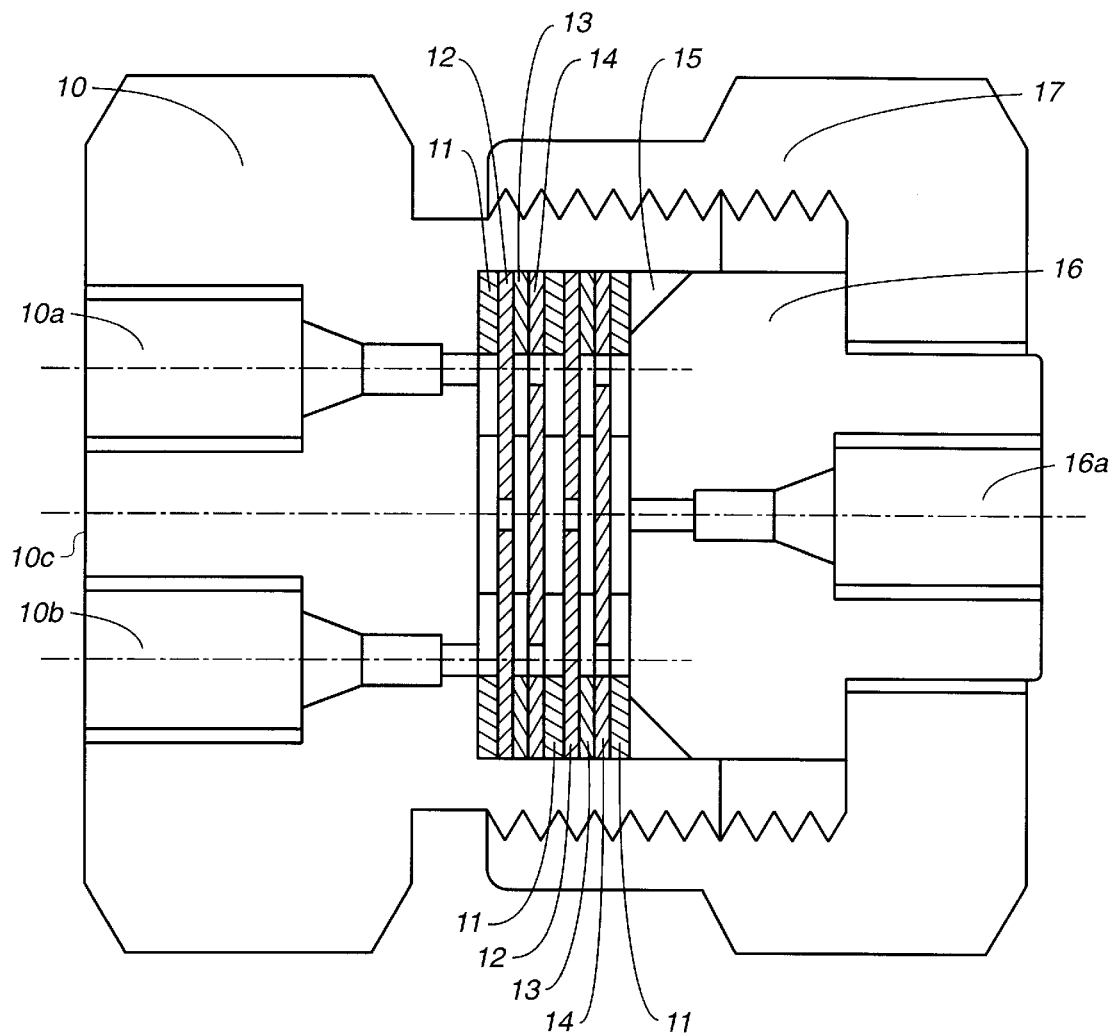
FIG._1

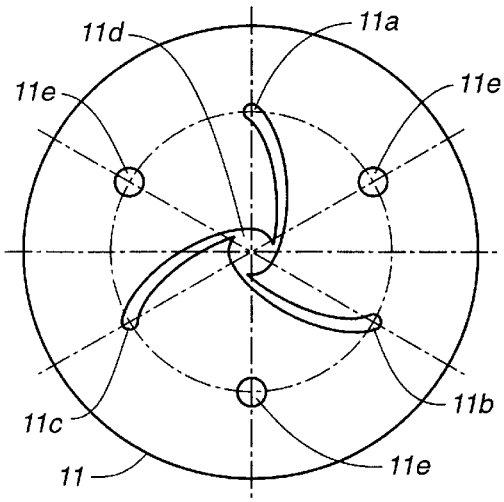
FIG._2
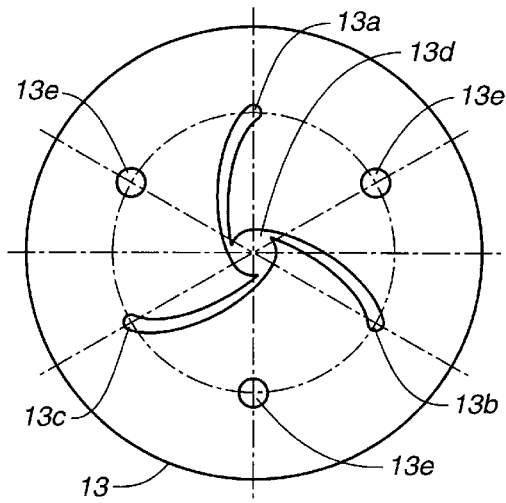
FIG._4
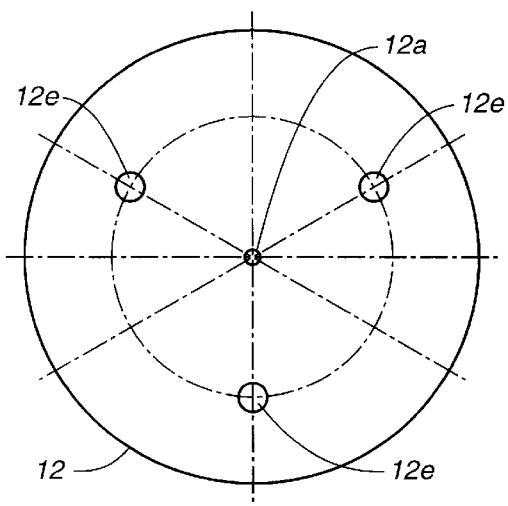
FIG._3
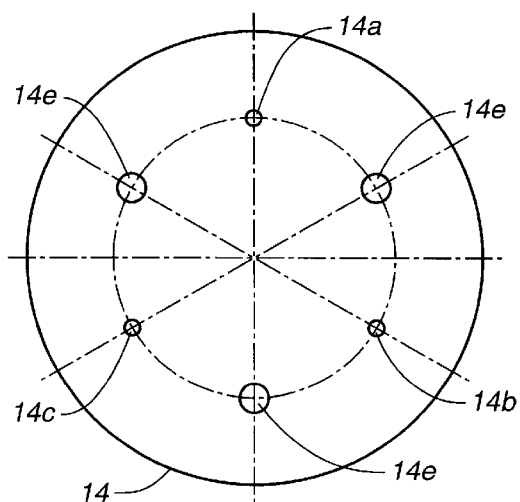
FIG._5

STATIONARY IN-LINE MIXER

BACKGROUND OF THE INVENTION

1. Field of the Invention

This invention relates generally to a mixing apparatus, and more particularly to a stationary in-line mixer used to mix various liquids in fluid streams.

2. Description of the Prior Art

In a high performance liquid chromatography high pressure gradient system where mixing of various liquids in which varying flow rate ratios are required, there can be a considerable change in the viscosity of the liquids when the mixing ratio of the fluids varies. A change in the viscosity of the fluids will induce changes in the pressure drop associated with the column.

Changes in the compression rate inside a mixer located at the pump outlet in the high pressure gradient system will cause changes in the flow rate of the liquids at the mixer outlet, which in turn will contribute to deterioration of the analytical accuracy. This is of critical importance in micro flow HPLC systems where the ratio between the internal mixer volume and pump flow rate tends to be large. In addition, when the internal mixer volume is large in a reaction chromatograph system where the mixer is located at the column outlet, sample band width will get larger, detection sensitivity will be lowered, and/or sample bands will overlap one another, resulting in poor analysis.

The present invention relates to a stationary on-line mixer, extremely small in its internal volume, and capable of mixing various liquids in fluid streams, thereby providing a solution to the above-mentioned problems.

SUMMARY OF THE INVENTION

The stationary on-line mixer of this invention provides an apparatus to mix various liquids in fluid streams. The inventive mixer, by having the liquids flow through a plurality of hole-bearing discs, having different configurations of openings at different locations, and stacked one upon another and housed in the mixer, mixes and divides fluid streams alternatively until the fluids are thoroughly mixed in a minimum of time, as is frequently required with analytical, reaction, testing, and other systems.

The inventive mixer apparatus includes an outer tubular casing with a plurality of fluid inlets and a fluid outlet axially spaced from the fluid inlets in the casing, a plurality of discs bearing a plurality of different holes or groove arrangements and which are stacked one upon another and housed face to face, aligned along a longitudinal axis between the fluid inlets and outlet, and a nut. The holes in the discs differ in their configurations and locations of openings, to induce a rotational angular velocity to the fluid streams. A mechanism is incorporated to prevent the discs from angular displacements relative to one another. The mixer mixes and divides fluid streams alternatively, as they pass through the discs.

To cope with the demand for extremely small mixer volume, the discs can be made of extremely thin materials and the mixer itself can be very small. The mixer is of extremely simple construction, easy to manufacture and simple to service. The discs can be manufactured by a variety of methods, including, but not limited to, stamping, machine-tooling, or photo-chemical processing. The mixer is easy to clean and can be manually disassembled and reassembled.

BRIEF DESCRIPTION OF THE DRAWINGS

FIG. 1 is an axial sectional view of the stationary online mixer of this invention, illustrating a mixer body, a stack of hole-bearing discs, a packing, an outlet joint, and a nut;

FIG. 2 shows the disc which is arranged as the first, fifth, and ninth discs in the stack (from the left as shown in FIG. 1);

FIG. 3 shows the disc which is arranged as the second and sixth discs in the stack (from the left as shown in FIG. 1);

FIG. 4 shows the disc which is arranged as the third and seventh discs in the stack (from the left as shown in FIG. 1); and FIG. 5 shows the disc which is arranged as the fourth and eighth discs in the stack (from the left as shown in FIG. 1).

DETAILED DESCRIPTION OF A PREFERRED EMBODIMENT

FIG. 1 exemplifies the mixer of this invention in an axial sectional view, illustrating the mixer body 10 having a plurality of mixer inlets 10a, 10b and 10c (not visible in this view), the plurality of hole-bearing discs 11, 12, 13, and 14, stacked in the sequential order 11-12-13-14-11-12-13-14-11, the packing 15, the outlet joint 16 with mixer outlet 16a, and the nut 17. FIG. 2 shows the disc 11 of FIG. 1, which is arranged as the first, fifth, and ninth discs in the stack from the left (i.e., from the inlet) as shown in FIG. 1. FIG. 3 shows the disc 12 of FIG. 1, which is arranged as the second and sixth discs in the stack from the left as shown in FIG. 1. FIG. 4 shows the disc 13 of FIG. 1, which may simply be identical to disc 11 (FIG. 2) but in an inverted (reversed) orientation, and arranged as the third and seventh discs in the stack from the left as shown in FIG. 1. FIG. 5 shows the disc 14 of FIG. 1, which is arranged as the fourth and eighth discs in the stack from the left as shown in FIG. 1.

Referring collectively to the drawing figures, the liquids in (e.g., three different) fluid streams entering the mixer inlets 10a, 10b, and 10c will enter radially converging arcuate grooves 11a, 11b, and 11c of disc 11, which is arranged as the first disc from the left in FIG. 1, and through those grooves enter the central mixing chamber 11d. Each groove leads to the mixing chamber 11d in a tangential direction, so that the liquids in the fluid streams are automatically given the rotational angular velocity for being mixed. The liquids mixed in the mixing chamber 11d will flow through the hole 12a of the disc 12 in FIG. 3 (arranged as the second disc from the left in FIG. 1) to enter the mixing chamber 13d of disc 13 (FIG. 4), 5 arranged as the third disc from the left in FIG. 1. The liquids mixed in the mixing chamber 13d will flow in the divided fluid streams to enter the radially diverging arcuate grooves 13a, 13b, and 13c of disc 13 (FIG. 4), which then flow through the holes 14a, 14b, and 14c (which are adjacent the terminus of the grooves 13a, 13b and 13c) of the disc 14 of FIG. 5 (arranged as the fourth disc in the stack from the left in FIG. 1) to enter the holes 11a, 11b, and 11c of another disc 11 of FIG. 2 (arranged as the fifth disc in the stack from the left in FIG. 1), and thence to discs 12, 13, 14 and 11 as described above. The liquids in the fluid streams will be alternately mixed and divided during which process the streams will be given the rotational angular velocity for mixing, and will ultimately flow out of mixing chamber 11d (disc 11, FIG. 2) and out the mixer outlet 16a (FIG. 1).

To prevent the discs from angular displacements relative to one another, disc alignment bores 11e, 12e, 13e and 14e are provided.

The explanations above given are for mixing three different liquids in the fluid streams as an example. Needless to say, this invention relates to any stationary in-line mixer for any plurality of liquids in fluid streams, and the number of discs can be increased or reduced depending upon the mixing accuracy and flow rates required. For example, the mixer may include only one sequence of discs, i.e., discs 11/12/13/14/11, then flowing out to the mixer outlet, or three or more sequences of discs.

The mixer is rather simple in its principle, but well-engineered, requiring a minimum of liquid channel volumes, which in turn contributes to the small dimensions of the mixer. At least some of the discs (e.g., discs 11 and 13 in FIGS. 2 and 4) are provided with grooves which lead to or from the mixing chamber in a tangential direction, thus giving the liquids in fluid streams the rotational angular velocity for spontaneous mixing. A further benefit of the invention is that the discs can be extremely small so that inexpensive photo-chemical processing can be used for their manufacture (provided that the disc material is metallic) rather than expensive machining of the complicated configurations, or stamping where expensive tooling is called for. Alternatively, non-metallic materials such as resins, ceramics, and others can be used for the discs.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims and equivalents.

What is claimed as invention is:

1. A stationary mixer apparatus to mix a plurality of liquids in fluid streams, said apparatus comprising:

a casing portion having a plurality of fluid inlets and a fluid outlet; and a plurality of disc members stacked in said casing portion between said fluid inlets and fluid outlet, said disc members bearing a plurality of different hole arrangements to induce a rotational angular velocity to the fluid streams passing therethrough and further comprising a first disc having a plurality of radially converging arcuate grooves connected to a central mixing chamber.

2. The mixer apparatus of claim 1 wherein said plurality of disc members comprise a second disc having a central hole.

3. The mixer apparatus of claim 2 wherein said plurality of disc members comprise a third disc having a central mixing chamber connected to a plurality of radially diverging arcuate grooves.

4. The mixer apparatus of claim 3 wherein said plurality of disc members comprise a fourth disc having a plurality of holes adjacent the terminus of the radially diverging arcuate grooves of said third disc.

5. The mixer apparatus of claim 4 wherein said plurality of disc members comprise a fifth disc analogous to said first disc.

6. The mixer apparatus of claim 5 wherein said plurality of disc members comprise a further sequence of discs arranged in the sequential order second disc, third disc, fourth disc and fifth disc.

\* \* \* \* \*